(12) United States Patent
Zhang et al.

(10) Patent No.: US 7,930,178 B2
(45) Date of Patent: Apr. 19, 2011

(54) SPEECH MODELING AND ENHANCEMENT BASED ON MAGNITUDE-NORMALIZED SPECTRA

(75) Inventors: Zhengyou Zhang, Bellevue, WA (US); Alejandro Acero, Bellevue, WA (US); Amarnag Subramanya, Seattle, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1265 days.

(21) Appl. No.: 11/317,269

(22) Filed: Dec. 23, 2005

(65) Prior Publication Data

US 2007/0150263 A1 Jun. 28, 2007

(51) Int. Cl.
*G10L 19/14* (2006.01)
*G10L 15/20* (2006.01)
*G10L 21/02* (2006.01)

(52) U.S. Cl. ......... 704/234; 704/233; 704/226; 704/224
(58) Field of Classification Search .................. 704/233, 704/266, 226, 234, 224
See application file for complete search history.

(56) References Cited

U.S. PATENT DOCUMENTS

| | | | |
|---|---|---|---|
| 3,383,466 A | 5/1968 | Hilix et al. ............. | 179/1 |
| 3,746,789 A | 7/1973 | Alcivar .................. | 179/1 |
| 3,787,641 A | 1/1974 | Santori .................. | 179/107 |
| 4,897,878 A * | 1/1990 | Boll et al. ............. | 704/233 |
| 5,054,079 A | 10/1991 | Frielingsdorf et al. .... | 381/159 |
| 5,151,944 A | 9/1992 | Yamamura ............. | 381/151 |
| 5,197,091 A | 3/1993 | Takagi et al. .......... | 379/433.12 |
| 5,295,193 A | 3/1994 | Ono ..................... | 381/151 |
| 5,404,577 A | 4/1995 | Zuckerman et al. ....... | 455/66 |
| 5,446,789 A | 8/1995 | Loy et al. | |
| 5,535,305 A * | 7/1996 | Acero et al. ............ | 704/256 |
| 5,555,449 A | 9/1996 | Kim ..................... | 379/433.03 |
| 5,647,834 A | 7/1997 | Ron ..................... | 600/23 |
| 5,692,059 A | 11/1997 | Kruger .................. | 381/151 |
| 5,757,934 A | 5/1998 | Yokoi ................... | 381/68.3 |
| 5,828,768 A | 10/1998 | Eatwell et al. .......... | 381/333 |
| 5,873,728 A | 2/1999 | Jeong ................... | 434/185 |
| 5,933,506 A | 8/1999 | Aoki et al. ............. | 381/151 |
| 5,943,627 A | 8/1999 | Kim et al. .............. | 379/426 |
| 5,983,073 A | 11/1999 | Ditzik .................. | 455/11.1 |
| 6,028,556 A | 2/2000 | Shiraki ................. | 343/702 |

(Continued)

FOREIGN PATENT DOCUMENTS

DE 199 17 169 11/2000

(Continued)

OTHER PUBLICATIONS

Ramachandran et al. "Modern methods of speech processing", Published by Kluwer Academic Publishers, Massachusetts, 1995.*

(Continued)

*Primary Examiner* — James S Wozniak
*Assistant Examiner* — Jialong He
(74) *Attorney, Agent, or Firm* — Theodore M. Magee; Westman, Champlin & Kelly, P.A.

(57) ABSTRACT

A frame of a speech signal is converted into the spectral domain to identify a plurality of frequency components and an energy value for the frame is determined. The plurality of frequency components is divided by the energy value for the frame to form energy-normalized frequency components. A model is then constructed from the energy-normalized frequency components and can be used for speech recognition and speech enhancement.

12 Claims, 8 Drawing Sheets

U.S. PATENT DOCUMENTS

| | | | | |
|---|---|---|---|---|
| 6,052,464 | A | 4/2000 | Harris et al. | 379/433 |
| 6,052,567 | A | 4/2000 | Ito et al. | 455/90 |
| 6,091,972 | A | 7/2000 | Ogasawara | 455/575.7 |
| 6,094,492 | A | 7/2000 | Boesen | 381/312 |
| 6,125,284 | A | 9/2000 | Moore et al. | 455/557 |
| 6,137,883 | A | 10/2000 | Kaschke et al. | 379/433.07 |
| 6,175,633 | B1 | 1/2001 | Morrill et al. | 381/71.6 |
| 6,243,596 | B1 | 6/2001 | Kikinis | 429/8 |
| 6,308,062 | B1 | 10/2001 | Chien et al. | 455/420 |
| 6,339,706 | B1 | 1/2002 | Tillgren et al. | 455/419 |
| 6,343,269 | B1 | 1/2002 | Harada et al. | 704/243 |
| 6,377,918 | B1 * | 4/2002 | Series | 704/226 |
| 6,408,081 | B1 | 6/2002 | Boesen | 381/312 |
| 6,411,933 | B1 | 6/2002 | Maes et al. | 704/273 |
| 6,542,721 | B2 | 4/2003 | Boesen | 455/90 |
| 6,560,468 | B1 | 5/2003 | Boesen | 455/568 |
| 6,594,629 | B1 | 7/2003 | Basu et al. | 704/251 |
| 6,664,713 | B2 | 12/2003 | Boesen | 310/328 |
| 6,675,027 | B1 | 1/2004 | Huang | 455/575 |
| 6,760,600 | B2 | 7/2004 | Nickum | 455/557 |
| 7,054,423 | B2 | 5/2006 | Nebiker et al. | 379/201.01 |
| 2001/0027121 | A1 | 10/2001 | Boesen | 455/556 |
| 2001/2924989 | | 10/2001 | Munehiro | |
| 2001/0039195 | A1 | 11/2001 | Nickum | 455/557 |
| 2002/0057810 | A1 | 5/2002 | Boesen | |
| 2002/0075306 | A1 | 6/2002 | Thompson et al. | |
| 2002/0181669 | A1 | 12/2002 | Takatori et al. | |
| 2002/0196955 | A1 | 12/2002 | Boesen | |
| 2002/0198021 | A1 | 12/2002 | Boesen | 455/556 |
| 2003/0040908 | A1 | 2/2003 | Yang et al. | |
| 2003/0083112 | A1 | 5/2003 | Fukuda | 455/568 |
| 2003/0093269 | A1 * | 5/2003 | Attias et al. | 704/226 |
| 2003/0125081 | A1 | 7/2003 | Boesen | 455/556 |
| 2003/0144844 | A1 | 7/2003 | Colmenarez et al. | 704/273 |
| 2004/0092297 | A1 | 5/2004 | Huang | |
| 2005/0114124 | A1 | 5/2005 | Liu et al. | |
| 2005/0143989 | A1 * | 6/2005 | Jelinek | 704/226 |
| 2005/0185813 | A1 | 8/2005 | Sinclair et al. | |
| 2006/0008256 | A1 | 1/2006 | Khedouri et al. | 386/124 |
| 2006/0009156 | A1 | 1/2006 | Hayes et al. | 455/63.1 |
| 2006/0072767 | A1 | 4/2006 | Zhang et al. | 381/71.6 |
| 2006/0079291 | A1 | 4/2006 | Granovetter et al. | 455/563 |
| 2006/0178880 | A1 | 8/2006 | Zhang et al. | |

FOREIGN PATENT DOCUMENTS

| | | |
|---|---|---|
| EP | 0 720 338 A2 | 7/1996 |
| EP | 0 854 535 A2 | 7/1998 |
| EP | 0 939 534 A1 | 9/1999 |
| EP | 0 951 883 | 10/1999 |
| EP | 1 333 650 | 8/2003 |
| EP | 1 569 422 | 8/2005 |
| FR | 2 761 800 | 4/1997 |
| GB | 2 375 276 | 11/2002 |
| GB | 2 390 264 | 12/2003 |
| JP | 3108997 | 5/1991 |
| JP | 5276587 | 10/1993 |
| JP | 8065781 | 3/1996 |
| JP | 8070344 | 3/1996 |
| JP | 8079868 | 3/1996 |
| JP | 10-023122 | 1/1998 |
| JP | 10-023123 | 1/1998 |
| JP | 11265199 | 9/1999 |
| JP | 2001119797 | 10/1999 |
| JP | 2001245397 | 2/2000 |
| JP | 20002-09688 | 7/2000 |
| JP | 2000196723 | 7/2000 |
| JP | 2000261529 | 9/2000 |
| JP | 2000261530 | 9/2000 |
| JP | 2000261534 | 9/2000 |
| JP | 2000354284 | 12/2000 |
| JP | 2002-125298 | 4/2002 |
| JP | 2002-358089 | 12/2002 |
| WO | WO 93/01664 | 1/1993 |
| WO | WO 95/17746 | 6/1995 |
| WO | WO 00/21194 | 10/1998 |
| WO | WO 99/04500 | 1/1999 |
| WO | WO 00/45248 | 8/2000 |
| WO | WO 02/77972 A1 | 3/2002 |
| WO | WO 02/098169 A1 | 12/2002 |
| WO | WO 03/055270 A1 | 3/2003 |

OTHER PUBLICATIONS

U.S. Appl. No. 10/629,278, filed Jul. 29, 2003, Huang et al.
U.S. Appl. No. 10/785,768, filed Feb. 24, 2004, Sinclair et al.
U.S. Appl. No. 10/636,176, filed Aug. 7, 2003, Huang et al.
Zheng Y. et ., "Air and Bone-Conductive Integrated Microphones for Robust Speech Detection and Enhancement" Automatic Speech Recognition and Understanding 2003. pp. 249-254.
De Cuetos P. et al. "Audio-visual intent-to-speak detection for human-computer interaction" vol. 6, Jun. 5, 2000. pp. 2373-2376.
M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.
P. Heracleous, Y. Nakajima, A. Lee, H. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.
O.M. Strand, T. Holter, A. Egeberg, and S. Stensby, "On the Feasibility of ASR in Extreme Noise Using the PARAT Earplug Communication Terminal," ASRU 2003, St. Thomas, U.S. Virgin Islands, Nov. 20-Dec. 4, 2003.
Z. Zhang, Z. Liu, M. Sinclair, A. Acero, L. Deng, J. Droppo, X. D. Huang, Y. Zheng, "Multi-Sensory Microphones For Robust Speech Detection, Enchantment, and Recognition," ICASSP 04, Montreal, May 17-21, 2004.
Bakar, "The Insight of Wireless Communication," Research and Development, 2002, Student Conference on Jul. 16-17, 2002.
Search Report dated Dec. 17, 2004 from International Application No. 04016226.5.
European Search Report from Application No. 05107921.8, filed Aug. 30, 2005.
European Search Report from Application No. 05108871.4, filed Sep. 26, 2005.
http://www.snaptrack.com/ (2004).
http://www.misumi.com.tw/PLIST.ASP?PC.ID:21 (2004).
http://www.wherifywireless.com/univLoc.asp (2001).
http://www.wherifywireless.com/prod.watches.htm (2001).
Microsoft Office, Live Communications Server 2003, Microsoft Corporation, pp. 1-10, 2003.
Shoshana Berger, http://www.cnn.com/technology, "Wireless, wearable, and wondrous tech," Jan. 17, 2003.
http://www.3G.co.uk, "NTT DoCoMo to Introduce First Wireless GPS Handset," Mar. 27, 2003.
"Physiological Monitoring System 'Lifeguard' System Specifications," Stanford University Medical Center, National Biocomputation Center, Nov. 8, 2002.
Nagl, L., "Wearable Sensor System for Wireless State-of-Health Determination in Cattle," Annual International Conference of the Institute of Electrical and Electronics Engineers' Engineering in Medicine and Biology Society, 2003.
Asada, H. and Barbagelata, M., "Wireless Fingernail Sensor for Continuous Long Term Health Monitoring," MIT Home Automation and Healthcare Consortium, Phase 3, Progress Report No. 3-1, Apr. 2001.
Kumar, V., "The Design and Testing of a Personal Health System to Motivate Adherence to Intensive Diabetes Management," Harvard-MIT Division of Health Sciences and Technology, pp. 1-66, 2004.
U.S. Appl. No. 11/156,434, filed Jun. 20, 2005, Zicheng et al.
"Direct Filtering for Air-and Bone-Conductive Microphones," Zicheng Liu et al., Multimedia Signal Processing, 2004, IEEE 6$^{th}$ Workshop on Siena, Italy, pp. 363-366.
"Air-and Bone-Conductive Integrated Microphones for Robust Speech Detection and Enhancement," Yanli Zheng et al., Automatic Speech Recognition and Understanding, 2003, 249-254.
European Search Report from Appln No.: 06100071.7, filed Jan. 4, 2006.
Z. Liu et al., "Leakage Model and Teeth Clack Removal for Air-and Bone-Conductive Integrated Microphones," in Proc. of the Int. Conf. on Acoustics, Speech and Signal Processing, Philadelphia, Mar. 2005.

J. Hershey et al., "Model-based Fusion of Bone and Air Sensors for speech Enhancement and Robust Speech Recognition," in Proc. ISCA Tutorial and research Workshops on Statistical and Perceptual Audio Processing, Jeju, South Korea, Oct. 2004.

L. Deng et al., "Nonlinear Information Fusion in Multi-sensor Processing—Extracting and Exploiting Hidden Dynamics of Speech Captured by a Bone-Conductive Microphone," in Proc. IEEE International Workshop on Multimedia Signal Processing, Siena, Italy, Sep. 2004.

R.J. McAulay et al., "Speech Enhancement Using a Soft-Decision Noise Suppression Filter," IEEE Trans. Acoustics, Speech, Signal Processing, vol. 28, No. 2, pp. 137-145, 1980.

H. Drucker, "Speech Processing in a High Ambient Noise Environment," IEEE Trans. Audio Electroacoust., vol. 16, No. 2, pp. 165-168, 1968.

J.S. Lim et al., "Enhancement and Bandwidth Compression of Noisy Speech," Proc. IEEE, vol. 67, No. 12, pp. 1586-1604, 1979.

Y. Ephraim, "A Bayesian Estimation Approach for Speech Enhancement Using Hidden Markov Models," IEEE Tran. Signal Processing, vol. 40, No. 4, pp. 725-735, 1992.

Y. Ephraim, "A Brief Survey of Speech Enhancement," in CRC Electronic Engineering Handbook, CRC Press, Feb. 2005.

J. Wu et al., "A Noise-Robust Asr Front-end Using Wiener Filer Constructed from MMSE Estimation of Clean Speech and Noise," in Proc. ASRU, Dec. 2003.

A. Subramanya, "A Graphical Model for Multi-Sensory Speech Processing In Air-and-Bone Conductive Microphones," In Proc. Eurospeech, Sep. 2005.

\* cited by examiner

SPEECH MODELING AND ENHANCEMENT BASED ON MAGNITUDE-NORMALIZED SPECTRA

BACKGROUND

Models that provide a prior probability of clean speech are often used in speech recognition and speech enhancement. These models indicate the probability of a clean speech feature vector without reference to an observed noisy feature vector. These prior models are typically trained by collecting speech signals in a noise-free environment from a small set of people.

Because only a small number of people are used to form the prior models of clean speech, differences between the speech of the people who train the model and the speech of the end users can be a source of error during recognition or enhancement. In particular, variations in the loudness of the speech signals due to variations in the speaker's voice or variations in the microphones that are used can cause errors in recognition and enhancement.

The discussion above is merely provided for general background information and is not intended to be used as an aid in determining the scope of the claimed subject matter.

SUMMARY

A frame of a speech signal is converted into the spectral domain to identify a plurality of frequency components and an energy value for the frame is determined. The plurality of frequency components is divided by the energy value for the frame to form energy-normalized frequency components. A model is then constructed from the energy-normalized frequency components and can be used for speech recognition and speech enhancement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
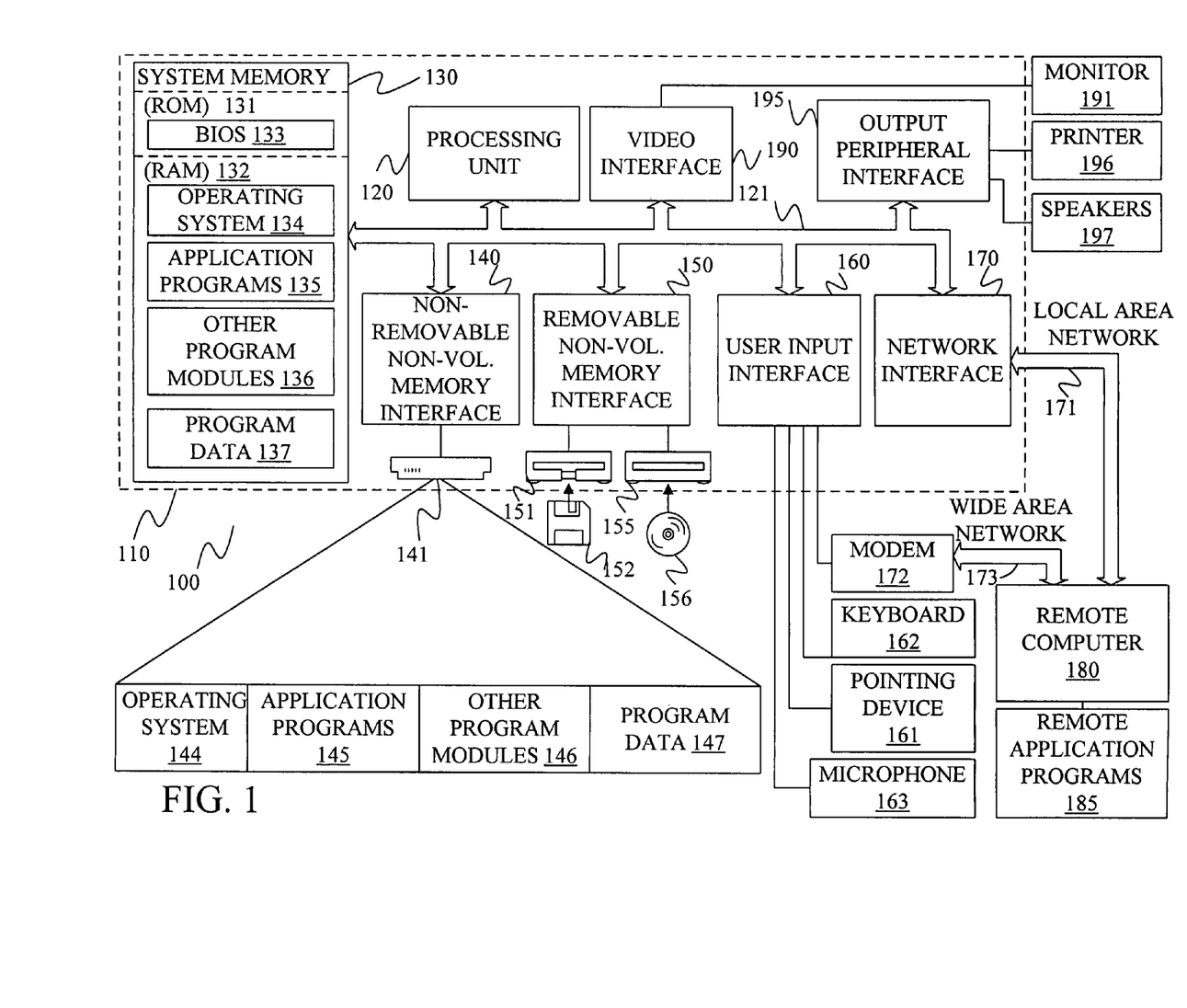
FIG. 1 is a block diagram of one computing environment in which embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
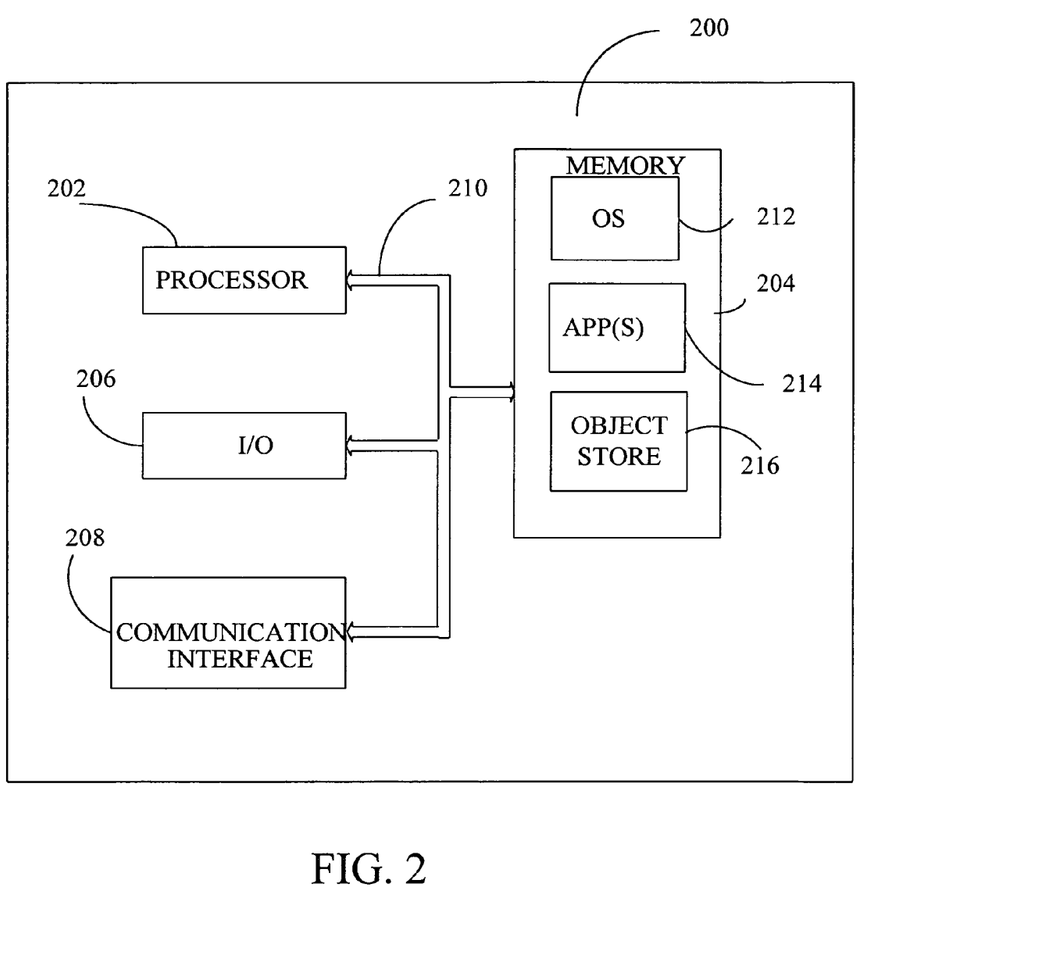
FIG. 2 is a block diagram of an alternative computing environment in which embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

To reduce errors due to changes in loudness and changes in the gains of recording devices while at the same time maintaining information about the phase of the speech signal, the claimed embodiments use energy-normalized complex spectra as features for a speech model. In particular, the spectral components of a frame of the speech signal are normalized with the energy of the frame as:

$$\tilde{X}_t = \frac{X_t}{\|X_t\|} \qquad \text{EQ. 1}$$

where $$\|X_t\| = \sqrt{\sum_{f=1}^{N/2} |X_{tf}|^2} \qquad \text{EQ. 2}$$

where $X_t$ represents a complex spectral feature vector formed through a Fast Fourier Transform of length N where the DC and Nyquist components are not included in the feature vector producing a feature vector having N/2−1 components, $|X_{tf}|$ is the magnitude of frequency component f of the feature vector, $\tilde{X}_t$ is the energy-normalized feature vector, the summation in Equation 2 is performed over all of the frequency components provided in the feature vector, and the division on the right-hand side of Equation 1 represents dividing each frequency component of the vector by the energy value determined in Equation 2.

Thus all $\tilde{X}_t$ are unit vectors and distribute on a unit hypersphere. It can be easily seen that forming the energy-normalized complex spectra reduces the variance because instead of attempting to capture the variations in an N-dimensional space, a region on a unit hypershpere is modeled.

Figure 3:
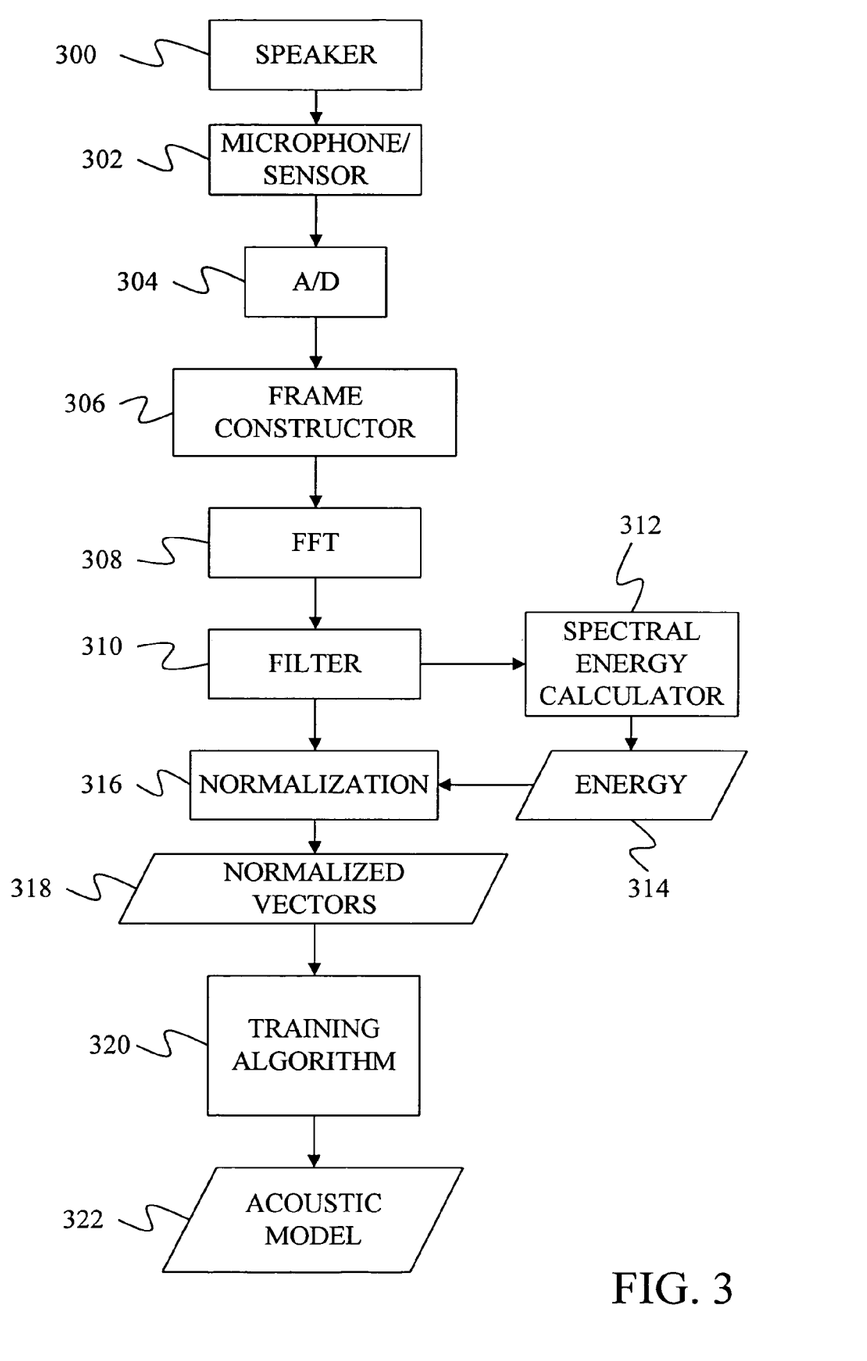
FIG. 3 is a block diagram of a system used to train an acoustic model.
Figure 4:
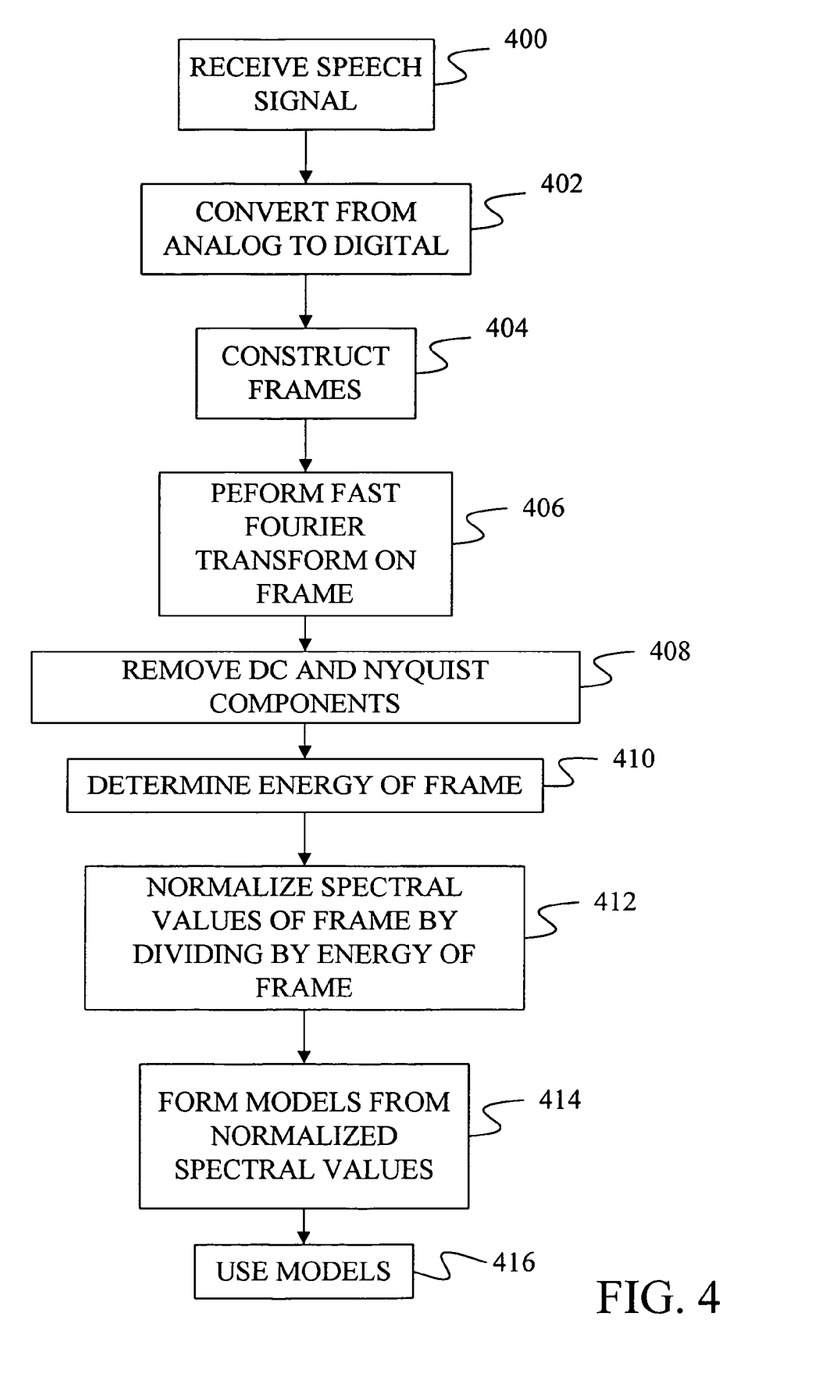
FIG. 4 is a flow diagram of a method of training an acoustic model.

FIG. 3 provides a block diagram of elements used to train an acoustic model using EQ. 1 and EQ. 2. FIG. 4 provides a flow diagram of a method of training such a model.

In step 400 of FIG. 4, a speech signal from a speaker 300 is received by a microphone/sensor 302, which converts the speech signal into an electrical analog signal. The analog signal is converted into a digital signal at step 402 by an analog-to-digital converter 304. In one embodiment, A-to-D converter 304 samples the analog signal at 16 kilohertz and 16 bits per sample, thereby creating 256 kilobits of speech data per second. The digital values are provided to a frame constructor 306, which constructs frames at step 404. Under one embodiment, a new frame is constructed for every 10 milliseconds of data and includes 20 milliseconds worth of data. Such frames can include square windowing or other types of known windowing.

At step 406, a Fast Fourier Transform 308 is performed on each frame of data. Under one embodiment, this Fast Fourier Transform involves converting N digital samples into N/2+1 frequency components where each frequency component has a magnitude and a phase. At step 408, the DC frequency component and the Nyquist frequency component are removed from the Fast Fourier Transform by filter 310 to produce a filtered spectral-domain feature vector. This helps to add robustness to the final model but is optional and may be omitted.

The filtered spectral-domain feature vector is provided to a spectral energy calculator 312, which uses Equation 2 above to calculate the energy 314 for the frame at step 410. At step 412, the filtered spectral-domain feature vector is normalized by normalization unit 316 using the energy value 314 for the frame and Equation 1 above. This forms an energy-normalized spectral-domain feature vector. The steps described above for forming an energy-normalized spectral-domain feature vector are repeated for a set of frames resulting in a set of energy-normalized spectral-domain feature vectors 318 that represent a plurality of utterances in a training speech signal.

At step 414, the set of energy-normalized spectral-domain feature vectors 318 generated from the frames of the training speech signal are applied to a training algorithm 320 to form an acoustic model 322. Any desired technique for training acoustic models from feature vectors may be used to train the model from the energy-normalized feature vectors. Under one embodiment, a mixture of Gaussians model is formed as acoustic model 322 using a k-means clustering algorithm with random initialization. This algorithm clusters the energy-normalized vectors into mixture components based on a distance measure and produces a separate Gaussian model for each mixture component. Under one embodiment, the distance between two energy-normalized vectors is defined as:

$$d(\tilde{X}_i, \tilde{X}_j) = \sqrt{\sum_{f=1}^{N/2} (\log|X_{if}| - \log|X_{jf}|)^2} \qquad \text{EQ. 3}$$

where f represents a frequency component, N represents the number of samples used in forming the Fast Fourier Transform, and $|X_{if}|$ represents the magnitude of the fth frequency component.

The clustering algorithm can be used to form mixture components for separate states. In particular, by using a speech detector, two states can be identified in the training signal, one for speech and one for non-speech, also referred to as silence. Energy-normalized vectors that fall within the speech state are then clustered into one set of mixture components and energy-normalized vectors that fall within the silence state are clustered into a separate set of mixture components. Under one embodiment, a single mixture component is provided for the silence state while a plurality of mixture components are provided for the speech state.

After the models have been formed, they may be used at step 416 for speech enhancement or speech recognition. When acoustic model 322 is used for speech recognition, the feature vectors applied to the model must match the feature vectors used to train the model. As such, the same Fast Fourier Transform, filtering, and energy normalization operations (steps 400-412) are performed on the feature vectors that are to be applied to the model. Once input energy-normalized feature vectors have been produced from the input signal, they are applied to the models to determine a probability of the input energy-normalized feature vectors.

The energy normalization of the vectors used to form the model and the vectors applied to the model helps remove variations in the loudness of the speech used to train the model as well as differences in loudness between the speech used to train the model and the speech used during recognition. Further, because the model is trained in the spectral domain, phase information is retained within the model. This would not be true if the model had been trained using cepstral vectors instead of spectral domain vectors since phase information is lost during the transform from the spectral domain to the cepstral domain.

Figure 5:
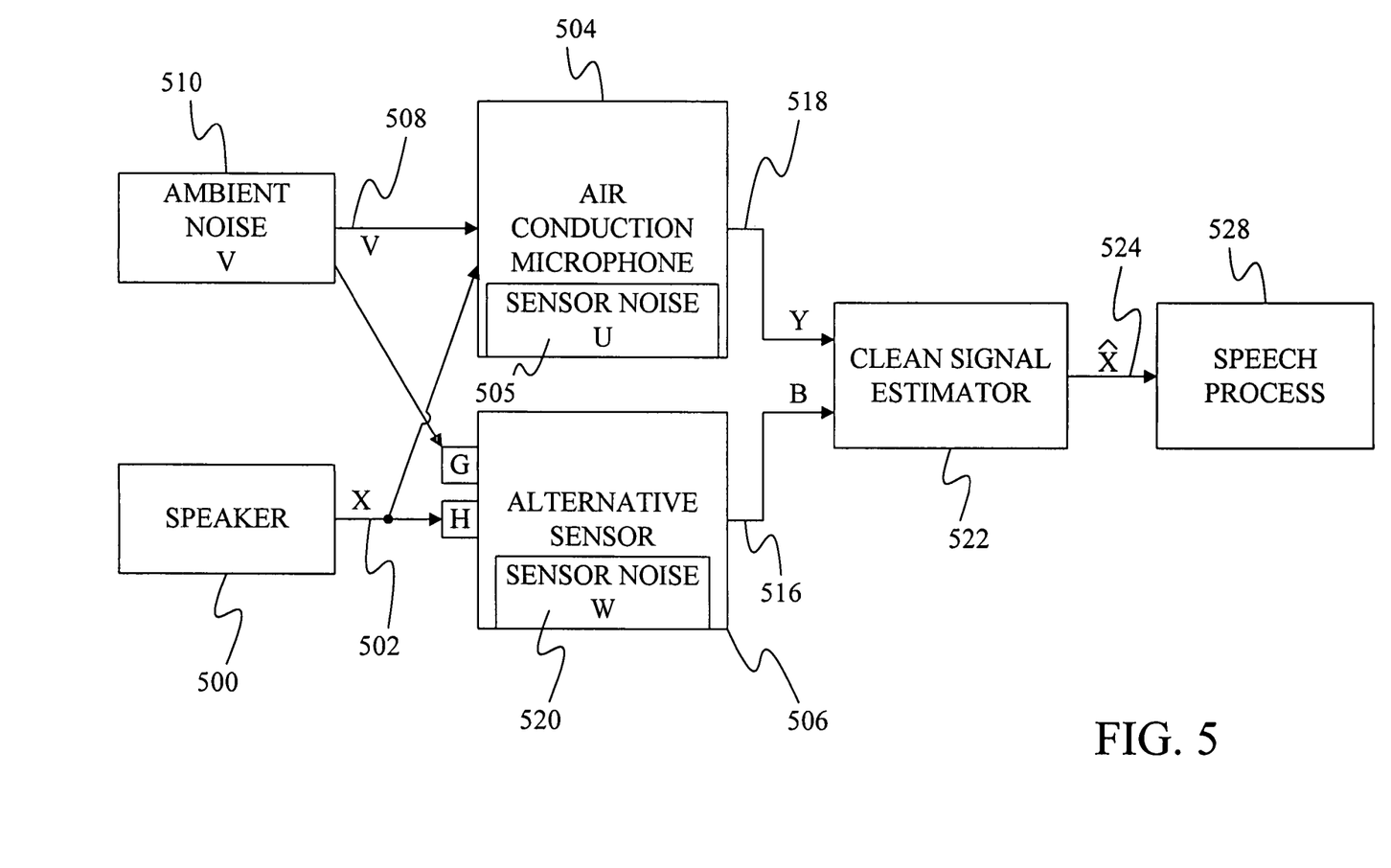
FIG. 5 is a block diagram of a system for collecting and processing speech signals

Energy-normalization in the spectral domain may also be used to enhance one or more noisy signals to produce a clean signal that may be applied to a speech process such as speech recognition or speech coding. FIG. 5 provides one example of a system in which energy-normalization can be used for speech enhancement.

In FIG. 5, a speaker 500 generates a speech signal 502 (X) that is detected by an air conduction microphone 504 and an alternative sensor 506. Examples of alternative sensors include a throat microphone that measures the user's throat vibrations, a bone conduction sensor that is located on or adjacent to a facial or skull bone of the user (such as the jaw bone) or in the ear of the user and that senses vibrations of the skull and jaw that correspond to speech generated by the user. Air conduction microphone 504 is the type of microphone that is used commonly to convert audio air waves into electrical signals.

Air conduction microphone 504 receives ambient noise 508 (V) generated by one or more noise sources 510 and generates its own sensor noise 505 (U). Depending on the type of ambient noise and the level of the ambient noise, ambient noise 508 may also be detected by alternative sensor 506. However, under some embodiments, alternative sensor 506 is typically less sensitive to ambient noise than air conduction microphone 504. Thus, the alternative sensor signal 516 (B) generated by alternative sensor 506 generally includes less noise than air conduction microphone signal 518 (Y) generated by air conduction microphone 504. Although alternative sensor 506 is less sensitive to ambient noise, it does generate some sensor noise 520 (W).

The path from speaker 500 to alternative sensor signal 516 can be modeled as a channel having a channel response H. The path from ambient noise 508 to alternative sensor signal 516 can be modeled as a channel having a channel response G.

Alternative sensor signal 516 (B) and air conduction microphone signal 518 (Y) are provided to a clean signal estimator 522, which estimates a clean signal 524. Clean signal estimate 524 is provided to a speech process 528. Clean signal estimate 524 may either be a time-domain signal or a spectral-domain vector. If clean signal estimate 524 is a time-domain signal, speech process 528 may take the form of a listener, a speech coding system, or a speech recognition system. If clean signal estimate 524 is a spectral-domain vector, speech process 528 will typically be a speech recognition system, or contain an Inverse Fourier Transform to convert the spectral domain vector into waveforms.

Figure 6:
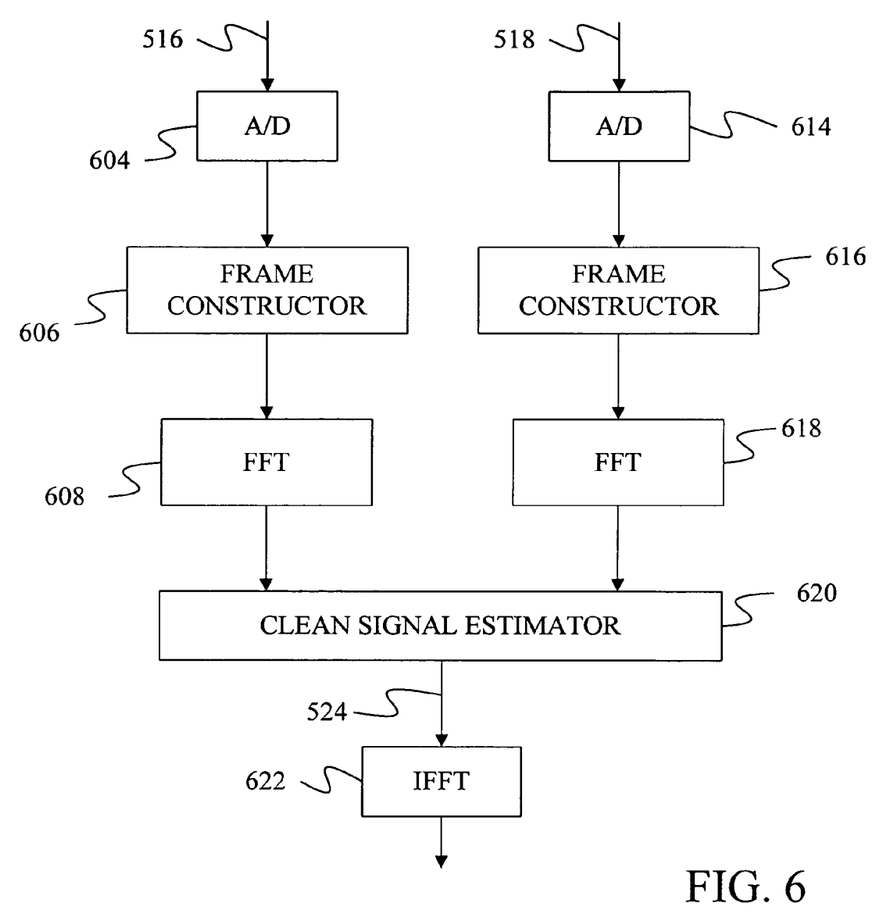
FIG. 6 is a block diagram of a system for enhancing speech.

Within clean signal estimator 522, alternative sensor signal 516 and microphone signal 518 are converted into the domain being used to estimate the clean speech. As shown in the embodiment of FIG. 6, alternative sensor signal 516 and air conduction microphone signal 518 are provided to analog-to-digital converters 604 and 614, respectively, to generate a sequence of digital values, which are grouped into frames of values by frame constructors 606 and 616, respectively. In one embodiment, A-to-D converters 604 and 614 sample the analog signals at 16 kHz and 16 bits per sample, thereby creating 32 kilobytes of speech data per second and frame constructors 606 and 616 create a new respective frame every 10 milliseconds that includes 20 milliseconds worth of data.

Each respective frame of data provided by frame constructors 606 and 616 is converted into the spectral domain using Fast Fourier Transforms (FFT) 608 and 618, respectively.

The spectral domain values for the alternative sensor signal and the air conduction microphone signal are provided to clean signal estimator 620, which uses the spectral domain values to estimate clean speech signal 524.

Under some embodiments, clean speech signal 524 is converted back to the time domain using Inverse Fast Fourier Transforms 622. This creates a time-domain version of clean speech signal 524.

Figure 7:
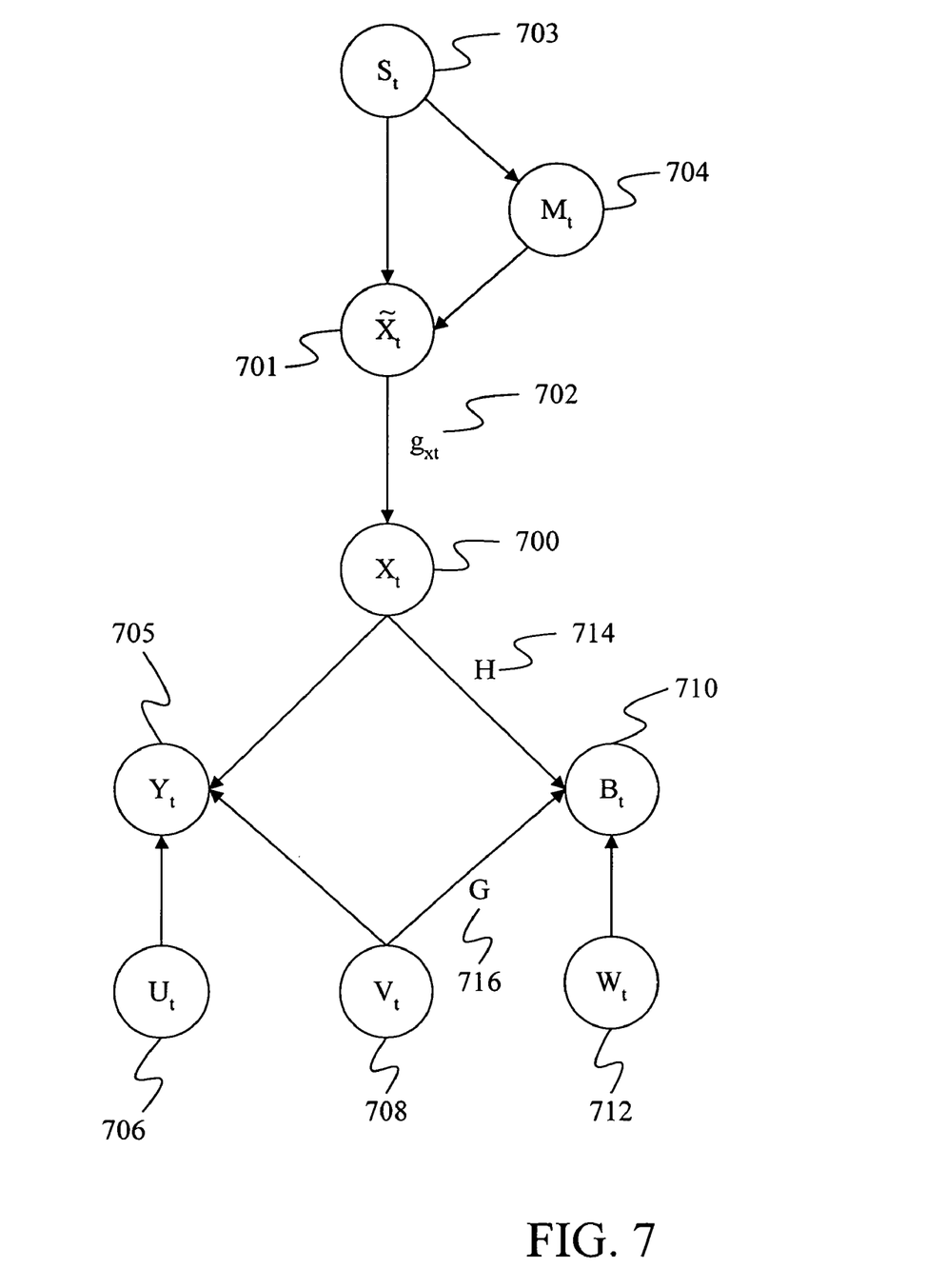
FIG. 7 is a model on which speech enhancement is based under one embodiment.

FIG. 7 provides a state graph that models the system of FIG. 5, showing the observed and hidden variables that are used during enhancement.

In the model of FIG. 7, clean speech 700 ($X_t$) is based upon energy-normalized speech 701 ($\tilde{X}_t$) as applied to a gain 702 ($g_{x_t}$) such that $X_t = g_{x_t} \tilde{X}_t$. Energy-normalized speech 701 is dependent on state 703 ($S_t$) and mixture component 704 ($M_t$), which is also dependent on state 703. Air conduction microphone signal 705 ($Y_t$) is dependent on sensor noise 706 ($U_t$), ambient noise 708 ($V_t$) and clean speech signal 700. Alternative sensor signal 710 ($B_t$) is dependent on sensor noise 712 ($W_t$), clean speech signal 700 as it passes through a channel response 714 (H) and ambient noise 708 ($V_t$) as it passes through a channel response 716 (G).

The model of FIG. 7 is used in speech enhancement to estimate a clean speech signal $X_t$ from noisy observations $Y_t$ and $B_t$.

Under one embodiment, the clean speech signal estimate and the likelihoods of the states for the clean speech signal estimate are formed by first assuming Gaussian distributions for the noise components in the system model. Thus:

$$V \sim N(0, \sigma_v^2) \qquad \text{EQ. 4}$$

$$U \sim N(0, \sigma_u^2) \qquad \text{EQ. 5}$$

$$W \sim N(0, \sigma_w^2) \qquad \text{EQ. 6}$$

where each noise component is modeled as a zero-mean Gaussian having respective variances $\sigma_v^2$, $\sigma_u^2$, and $\sigma_w^2$, V is the ambient noise, U is the sensor noise in the air conduction microphone, and W is the sensor noise in the alternative sensor.

In the description of the equations below for determining the estimate of the clean speech signal, all of the variables are modeled in the complex spectral domain. Each frequency component is treated independently of the other frequency components except for variables $S_t$ and $M_t$. $S_t$ and $M_t$ are global for each frame. For ease of notation, the method is described below for a single frequency component. Those skilled in the art will recognize that the computations are performed for each frequency component in the spectral version of the input signals. For variables that vary with time, a subscript t is added to the variable.

To estimate the clean speech signal $X_t$ from the noisy observations $Y_t$ and $B_t$, some embodiments use the conditional probability $p(\tilde{X}_t | Y_t, B_t)$, which is the probability of the energy-normalized clean speech signal given the noisy air conduction microphone signal and the noisy alternative sensor signal. Since the estimate of the energy-normalized clean speech signal depends on the speech state $S_t$ and the mixture component $M_t$ under the model, this conditional probability is determined as:

$$E[p(\tilde{X}_t \mid Y_t, B_t)] = \sum_{s,m} E[p(\tilde{X}_t \mid Y_t, B_t, M_t = m, S_t = s)] \quad \text{EQ. 8}$$

$$p(M_t = m \mid S_t = s, Y_t, B_t) p(S_t = s \mid Y_t, B_t)$$

where the summation is taken over all combinations of speech states s and mixture components m, $p(\tilde{X}_t|Y_t,B_t,M_t=m,S_t=s)$ is the likelihood of $\tilde{X}_t$ given the current noisy observations, mixture component m and speech state s, $p(M_t=m|Y_t,B_t,S_t=s)$ is the likelihood of mixture component m given the noisy observations and speech state s, and $p(S_t=s|Y_t,B_t)$ is the likelihood of the speech state s given the noisy observations.

In some embodiments, two states s are provided, one for speech and one for silence. Any number of mixture components may be used, including mixture components for voiced sounds, fricatives, nasal sounds and back vowel sounds. In some embodiments, a separate mixture component is provided for each of a set of phonetic units, such as phonemes. Under one particular embodiment, four mixture components are provided for the speech state and one mixture component is provided for the silence state.

Using Equation 7, the expectation for the energy-normalized clean speech value is computed as:

$$p(\tilde{X}_t \mid Y_t, B_t) = \sum_{s,m} p(\tilde{X}_t \mid Y_t, B_t, M_t = m, S_t = s) \quad \text{EQ. 7}$$

$$p(M_t = m \mid S_t = s, Y_t, B_t) p(S_t = s \mid Y_t, B_t)$$

where E[ ] is the expectation operator.

Under one embodiment, the probability $p(\tilde{X}_t|Y_t,B_t,M_t=m,S_t=s)$ is estimated as a Gaussian distribution $N(\tilde{X}_t;A_{1sm},\Phi_{1sm})$ with mean $A_{1sm}$ and variance $\Phi_{1sm}$ where:

$$A_{1sm} = \frac{\sigma_{sm}^2(\sigma_1^2(\sigma_{uv}^2\mu_{sm} + g_{x_t}Y_t) + g_{x_t}H_m^*(B_t\sigma_{uv}^2 - G\sigma_v^2 Y_t))}{\sigma_1^2\sigma_2^2 + g_{x_t}^2\sigma_{sm}^2\sigma_{uv}^2|H_m|^2} \quad \text{Eq. 9}$$

$$\Phi_{1sm} = \frac{\sigma_1^2\sigma_{sm}^2\sigma_{uv}^2}{\sigma_1^2\sigma_2^2 + g_{x_t}^2\sigma_{sm}^2\sigma_{uv}^2|H_m|^2} \quad \text{Eq. 10}$$

$$\sigma_{uv}^2 = \sigma_v^2 + \sigma_u^2 \quad \text{Eq. 11}$$

$$\sigma_1^2 = \sigma_w^2 + \frac{|G|^2\sigma_u^2\sigma_v^2}{\sigma_{uv}^2} \quad \text{Eq. 12}$$

$$\sigma_2^2 = \sigma_{uv}^2 + g_{x_t}^2\sigma_{sm}^2 \quad \text{Eq. 13}$$

$$H_m = H - G\frac{\sigma_v^2}{\sigma_{uv}^2} \quad \text{Eq. 14}$$

and where $\mu_{sm}$ and $\sigma_{sm}^2$ represent the mean and variance for the mixture model of the energy-normalized clean speech value for state s and mixture component m that have been trained using the techniques described above such that:

$$p(\tilde{X}_t|S_t=s,M_t=m) = N(\tilde{X}_t;\mu_{sm},\sigma_{sm}^2) \quad \text{Eq. 15}$$

Using the equations above, the expectation $E[p(\tilde{X}_t|Y_t,B_t,M_t=m,S_t=s)]$ is simply the mean $A_{1sm}$.

Under one embodiment, the mixture component m and the state s are shared across all frequency components. As noted above, the computations to this point are performed separately for each frequency component. However, since the mixture component and state are shared across frequency components, the posterior probabilities $p(M_t=m|S_t=s,Y_t,B_t)$ and $p(S_t=s|Y_t,B_t)$ are approximated by aggregating the likelihoods due to each frequency component. This results in:

$$p(M_t = m \mid S_t = s, Y_t, B_t) \sim L(M_t = m \mid S_t = s, Y_t, B_t) \quad \text{EQ. 16}$$

$$L(M_t = m \mid S_t = s, Y_t, B_t) = \quad \text{EQ. 17}$$
$$p(S_t = s)p(M_t = m \mid S_t = s)\prod_{all\ f} L_{1sm}^f L_{2sm}^f$$

$$p(S_t = s \mid Y_t, B_t) \sim L(S_t = s \mid Y_t, B_t) \quad \text{EQ. 18}$$

$$L(S_t = s \mid Y_t, B_t) = \sum_m p(S_t = s)p(M_t = m \mid S_t = s)\prod_{all\ f} L_{1sm}^f L_{2sm}^f \quad \text{EQ. 19}$$

where $L(M_t=m|S_t=s,Y_t,B_t)$ is the likelihood for mixture component m across all frequencies and $L(S_t=s|Y_t,B_t)$ is the likelihood of state s across all frequencies and where:

$$L_{1sm}^f = N(B_t^f; A_{2sm}^f, \Phi_{2sm}^f) \quad \text{Eq. 20}$$

$$L_{2sm}^f = N(Y_t^f; g_{x_t}\mu_{sm}^j, (\sigma_1^2)^f) \quad \text{Eq. 21}$$

$$A_{2sm}^f = g_{x_t}H_m^f \frac{(\sigma_{uv}^2)^f \mu_{sm}^f + g_{x_t}(\sigma_{sm}^2)^f Y_t^f}{(\sigma_2^2)^f} + \frac{G^f(\sigma_v^2)^f Y_t^f}{(\sigma_{uv}^2)^f} \quad \text{Eq. 22}$$

$$\Phi_{2sm}^f = (\sigma_1^2)^f + g_{x_t}|H_m^f|^2 \frac{(\sigma_{sm}^2)^f(\sigma_{uv}^2)^f}{(\sigma_2^2)^f} \quad \text{Eq. 23}$$

where the superscript f indicates the fth frequency component.

Under some embodiments, the conditional probabilities of the mixture components for each state are evenly divided among the components associated with the state. Thus, in embodiments where there is a single mixture component for the silence state, the conditional probability is $$p(M_t=\text{silence component}|S_t=\text{silence})=1 \quad \text{Eq. 24}$$

and where there are M mixture components for the speech state, the probability of each component is determined as:

$$p(M_t=m|S_t=\text{speech})=1/M \quad \text{Eq. 25}$$

Under some embodiments, the prior probability for the states are divided evenly between speech and silence. In other embodiments, smoothness of the states between frames is introduced by basing the prior probability of each state on the posterior probability of the state in the preceding frame such that:

$$p(S_t = \text{speech}) = \frac{0.5 + p(S_{t-1} = \text{speech} \mid Y_{t-1}, B_{t-1})}{2} \quad \text{Eq. 26}$$

$$p(S_t = \text{silence}) = 1 - p(S_t = \text{speech}) \quad \text{Eq. 27}$$

Figure 8:
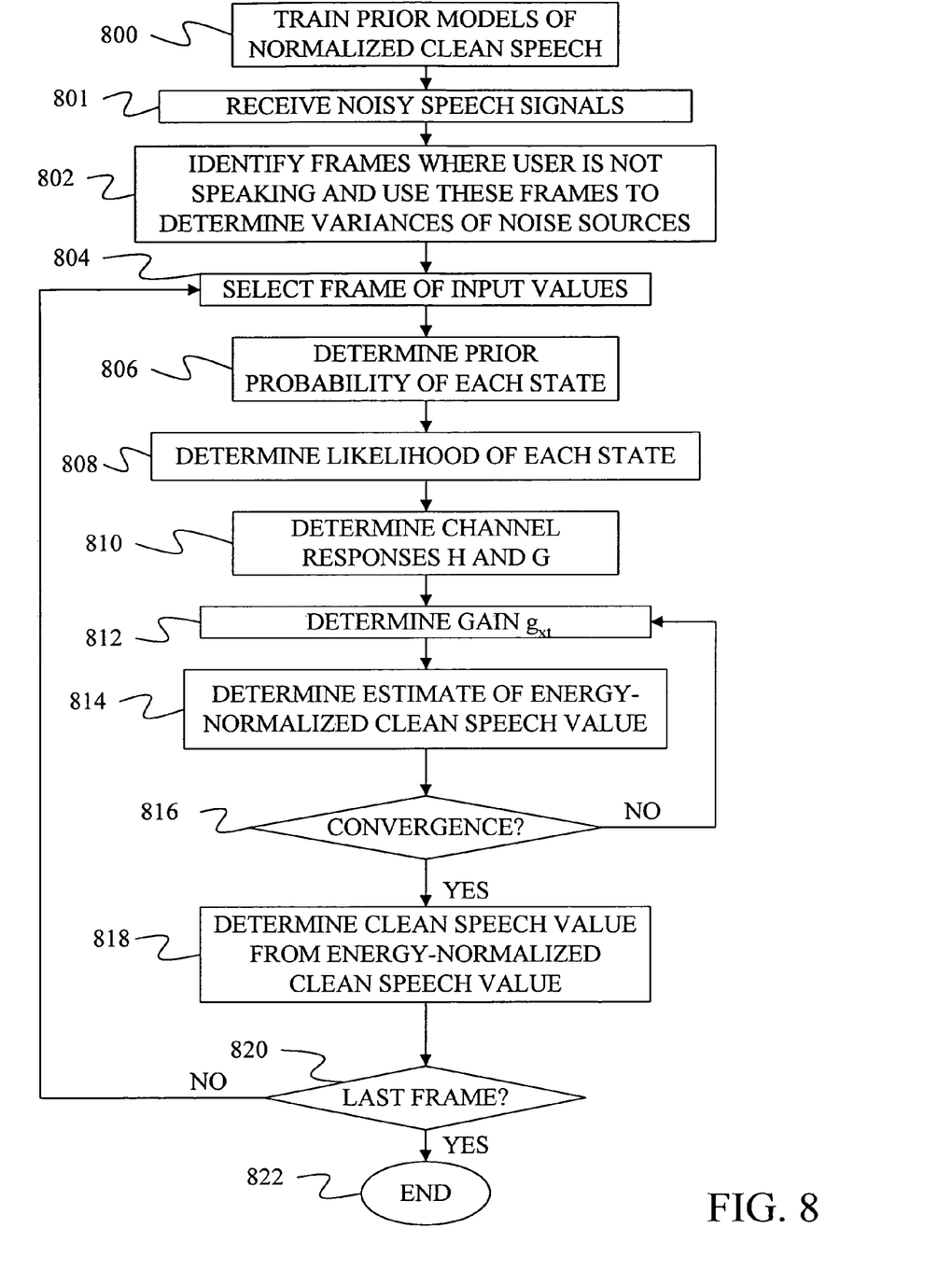
FIG. 8 is a flow diagram for enhancing speech under one embodiment.

FIG. 8 provides a method of performing speech enhancement in which a clean speech signal, also referred to as a noise-reduced speech signal, is estimated from noisy input speech signals using the equations above. In step 800, a prior model of energy-normalized clean speech is trained using the method of FIG. 4.

At step 801, noisy input speech signals are received and at step 802, frames of the input speech signals are identified where the user is not speaking. These frames are then used to determine the variance for the ambient noise $\sigma_v^2$, the variance for the alternative sensor noise $\sigma_w^2$, and the variance for the air conduction microphone noise $\sigma_u^2$.

To identify frames where the user is not speaking, the alternative sensor signal can be examined. Since the alternative sensor signal will produce much smaller signal values for background speech than for noise, when the energy of the alternative sensor signal is low, it can initially be assumed that the speaker is not speaking. The values of the air conduction microphone signal and the alternative sensor signal for frames that do not contain speech are stored in a buffer and are used to compute variances of the noise as:

$$\hat{\sigma}_v^2 = \frac{1}{N_v} \sum_{all\ t \in V} |Y_t|^2 \qquad \text{EQ. 28}$$

$$\hat{\sigma}_w^2 = \frac{1}{N_v} \sum_{all\ t \in V} |B_t'|^2 \qquad \text{EQ. 29}$$

where $N_v$ is the number of noise frames in the utterance that are being used to form the variances, V is the set of noise frames where the user is not speaking, and $B_t'$ refers to the alternative sensor signal after leakage has been accounted for, which is calculated as:

$$B_t' = B_t - GY_t \qquad \text{EQ. 30}$$

which in some embodiments is alternatively calculated as:

$$B_t' = \left(1 - \frac{|GY_t|}{|B_t|}\right) B_t \qquad \text{EQ. 31}$$

Under some embodiments, the technique of identifying non-speech frames based on low energy levels in the alternative sensor signal is only performed during the initial frames of training. After initial values have been formed for the noise variances, they may be used to determine which frames contain speech and which frames do not contain speech using a likelihood ratio discussed below.

The variance of the noise for the air conduction microphone, $\sigma_u^2$, is estimated based on the observation that the air conduction microphone is less prone to sensor noise than the alternative sensor. As such, the variance of the air conduction microphone can be calculated as:

$$\sigma_U^2 = 1e^{-4} \sigma_w^2 \qquad \text{EQ. 32}$$

At step 804, the next frame of the air microphone signal $Y_t$ and alternative sensor signal $B_t$ is selected. At step 806, the prior probabilities of the states are determined using equations 26 and 27 above. These prior probabilities are then used at step 808 to determine the likelihood for each state given the current frame of the air microphone signal $Y_t$ and alternative sensor signal $B_t$ using equations 19-27 above. The likelihoods for each state are used to classify the current frame as speech or silence by forming a ratio:

$$r = \log \frac{L(S_t = \text{speech} | Y_t, B_t)}{L(S_t = \text{silence} | Y_t, B_t)} \qquad \text{EQ. 33}$$

where a frame is considered to contain speech if the ratio r is greater than 0 and is considered to not contain speech otherwise.

At step 810, the alternative sensor's channel response G for background noise and the alternative sensor's channel response H for speech are estimated from the signals of the air microphone Y and of the alternative sensor B. In particular, channel response G is estimated using the last D frames of Y and B in which the user is not speaking as identified using equation 33. Specifically, G is determined as:

$$G = \frac{\sum_{t=1}^{D}(\sigma_u^2|B_t|^2 - \sigma_w^2|Y_t|^2) \pm \sqrt{\left(\sum_{t=1}^{D}(\sigma_u^2|B_t|^2 - \sigma_w^2|Y_t|^2)\right)^2 + 4\sigma_u^2\sigma_w^2\left|\sum_{t=1}^{D} B_t^* Y_t\right|^2}}{2\sigma_u^2 \sum_{t=1}^{D} B_t^* Y_t} \qquad \text{Eq. 34}$$

where D is the number of frames in which the user is not speaking but there is background noise, and $B_t^*$ represents the complex conjugate of the complex value $B_t$. Here, we assume that G is constant across all time frames D. In other embodiments, instead of using all the D frames equally, we use a technique known as "exponential aging" so that the latest frames contribute more to the estimation of G than the older frames.

The alternative sensor's channel response H for the clean speech signal is estimated from the signals of the air microphone Y and of the alternative sensor B across the last T frames in which the user is speaking. Specifically, H is determined as:

$$H = \frac{\sum_{t=1}^{T}(\sigma_v^2|B_t|^2 - \sigma_w^2|Y_t|^2) \pm \sqrt{\left(\sum_{t=1}^{T}(\sigma_v^2|B_t|^2 - \sigma_w^2|Y_t|^2)\right)^2 + 4\sigma_v^2\sigma_w^2\left|\sum_{t=1}^{T} B_t^* Y_t\right|^2}}{2\sigma_v^2 \sum_{t=1}^{D} B_t^* Y_t} \qquad \text{Eq. 35}$$

where T is the number of frames in which the user is speaking. Here, it is assumed that H is constant across all time frames T. In other embodiments, instead of using all the T frames equally, "exponential aging" is used so that the latest frames contribute more to the estimation of H than the older frames.

At step 812, an iteration is started in which the gain $g_{x_t}$ and an estimate of the energy-normalized clean speech value $\tilde{X}_t$ are iteratively determined. Under one embodiment, the gain is calculated in step 812 as:

$$g_{x_t} = \frac{\sum_{all\ f}\left[(Y_t^* \tilde{X}_t + Y_t \tilde{X}_t^*)\sigma_w^2 + C\sigma_v^2\right]}{\sum_{all\ f}\left[|\tilde{X}_t|^2 \sigma_w^2 + |H - G|^2 |\tilde{X}_t|^2 \sigma_v^2\right]} \qquad \text{Eq. 36}$$

where $$C = (B_t - GY_t) * (H - G)\tilde{X}_t + (B_t - GY_t)(H - G) * \tilde{X}_t^* \qquad \text{EQ. 37}$$

where the superscript * indicates the complex conjugate and where $\tilde{X}_t$ is initially set to $\tilde{X}_{t-1}$.

At step 814, $\tilde{X}_t$ is estimated using equations 8-19 above to determine the expected value of $\tilde{X}_t$. At step 816, the estimate of the energy-normalized clean speech value $\tilde{X}_t$ is examined to determine if it has converged. If it has not converged, the process returns to step 812 to update the gain. Steps 812, 814, and 816 are repeated until the energy-normalized clean speech value converges.

Once the energy-normalized clean speech value converges, it is multiplied by the gain at step 818 to form the estimate of the clean speech value as:

$$X_t = g_{x_t} \hat{X}_t \qquad \text{Eq. 38}$$

At step 820, the method determines if this is the last frame of the input signals. If this is not the last frame, the process returns to step 804 to select the next frame. Steps 804 through 818 are then performed to identify a clean speech signal from the noisy input signals for the selected frame. When the last frame of the noisy input signals is reached at step 820, the process ends at step 822.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    converting frames of a speech signal into the spectral domain to identify feature vectors each comprising a plurality of frequency components;
    removing a D.C. frequency component from the plurality of frequency components to form a plurality of filtered frequency components;
    determining an energy value for the filtered frequency components for each frame;
    for each frame, dividing the plurality of filtered frequency components of the feature vector for the frame by the energy value for the filtered frequency components for the frame to form an energy-normalized feature vector comprising energy-normalized frequency components for the frame; and
    a processor constructing a model from the energy-normalized feature vectors, wherein
    constructing the model comprises:
        clustering frames of energy-normalized frequency components into mixture components by determining a distance $d(\tilde{X}_i, \tilde{X}_j)$ between an energy-normalized feature vector $\tilde{X}_i$ for a frame i and an energy-normalized feature vector $\tilde{X}_j$ for a frame j as:

$$d(\tilde{X}_i, \tilde{X}_j) = \sqrt{\sum_{f=1}^{N/2} (\log|X_{if}| - \log|X_{jf}|)^2} ,$$

where N is a number of samples of the speech signal in each frame used to convert the speech signal into the spectral domain, $|X_{if}|$ is the fth energy-normalized frequency component for energy-normalized feature vector and $\tilde{X}_i$ and $|X_{jf}|$ is the fth energy-normalized frequency component for energy-normalized feature vector $\tilde{X}_j$; and
    forming separate model parameters for each mixture component.

2. The method of claim 1 further comprising using the model to determine a likelihood for a frame of an input speech signal by:
    converting the frame of the input speech signal to the spectral domain to produce a plurality of frequency components;
    determining an energy value for the frame of the input signal;
    dividing the plurality of frequency components of the frame of the input speech signal by the energy value for the frame of the input signal to form input energy-normalized frequency components; and
    applying the input energy-normalized frequency components to the model to determine the likelihood.

3. The method of claim 1 further comprising using the model to estimate a clean speech value from a noisy speech signal.

4. A computer storage medium having computer-executable instructions for performing steps comprising:
    receiving values representing a noisy air conduction microphone signal;
    receiving values representing a noisy alternative sensor signal; and
    using a model of energy-normalized clean-speech spectral values to estimate a vector of energy-normalized noise-reduced speech spectral values from the noisy air conduction microphone signal and the noisy alternative sensor signal by determining an expected value for each mixture component and state of the model as:

$$A_{1sm} = \frac{\sigma_{sm}^2(\sigma_1^2(\sigma_{uv}^2 \mu_{sm} + g_{x_t} Y_t) + g_{x_t} H_m^*(B_t \sigma_{uv}^2 - G \sigma_v^2 Y_t)}{\sigma_1^2 \sigma_2^2 + g_{x_t}^2 \sigma_{sm}^2 \sigma_{uv}^2 |H_m|^2} \sigma_{uv}^2 = \sigma_v^2 + \sigma_u^2$$

$$\sigma_1^2 = \sigma_w^2 + \frac{|G|^2 \sigma_u^2 \sigma_v^2}{\sigma_{uv}^2}$$

$$\sigma_2^2 = \sigma_{uv}^2 + g_{x_t}^2 \sigma_{sm}^2$$

$$H_m = H - G \frac{\sigma_v^2}{\sigma_{uv}^2}$$

where $A_{1sm}$ is a vector of expected energy-normalized noise-reduced spectral values for state s and mixture component m, $\mu_{sm}$ is a mean vector of the model of energy-normalized clean-speech spectral values for state s and mixture component m, $\sigma_{sm}^2$ is a variance of the model of energy-normalized clean-speech spectral values for state s and mixture component m, $Y_t$ is a value of the air conduction microphone signal for a frame t, $B_t$ is a value of the alternative sensor signal for frame t, $g_{x_t}$ is a gain value that describes a ratio of clean speech spectral values to energy-normalized clean speech spectral values for frame t, $\sigma_v^2$ is a variance in ambient noise, $\sigma_u^2$ is a variance of a distribution of sensor noise in the air conduction microphone, $\sigma_w^2$ is a variance in a distribution of sensor noise in the alternative sensor, H is a channel response for a path from a speaker to the alternative sensor signal, and G is a channel response for a path from ambient noise to the alternative sensor signal.

5. The computer storage medium of claim 4 wherein estimating a noise-reduced value further comprises estimating the gain value that describes the ratio of clean speech spectral values to energy-normalized clean speech spectral values.

6. The computer storage medium of claim 5 wherein estimating a noise-reduced value comprises estimating energy-normalized noise-reduced speech spectral values and multiplying the energy-normalized noise-reduced speech spectral values by the gain value to produce noise-reduced values.

7. The computer storage medium of claim 6 further comprising estimating a separate gain value for each of a plurality of frames of the noisy speech signal.

8. The computer storage medium of claim 4 wherein estimating a noise-reduced value further comprises utilizing a model of a speech state that provides the probability that a frame of the noisy speech signal contains speech.

9. A method comprising:
  receiving an air conduction microphone signal;
  receiving an alternative sensor signal;
  using the air conduction microphone signal, the alternative sensor signal, and a model of energy-normalized clean speech spectral values to estimate a noise-reduced speech value, wherein estimating a noise-reduced speech value comprises estimating energy-normalized noise-reduced speech spectral values and converting the energy-normalized noise-reduced speech spectral values into noise-reduced speech values by multiplying the energy-normalized noise-reduced speech spectral values by a gain value determined as:

$$g_{x_t} = \frac{\sum_{all\ f}\left[(Y_t^*\tilde{X}_t + Y_t\tilde{X}_t^*)\sigma_w^2 + C\sigma_v^2\right]}{\sum_{all\ f}\left[|\tilde{X}_t|^2\sigma_w^2 + |H-G|^2\ |\tilde{X}_t|^2\ \sigma_v^2\right]}$$

where
$$C = (B_t - GY_t)^*(H-G)\tilde{X}_t + (B_t - GY_t)(H-G)^*\tilde{X}_t^*$$

where the superscript * indicates the complex conjugate, $g_{x_t}$ is the gain value for a frame t, $\tilde{X}_t$ is an estimate of an energy-normalized noise-reduced speech spectral value for frame t, $Y_t$ is a value of the air conduction microphone signal for frame t, $B_t$ is a value of the alternative sensor signal for frame t, $\sigma_u^2$ a variance of a distribution of sensor noise in the air conduction microphone, $\sigma_w^2$ is a variance in a distribution of sensor noise in the alternative sensor, H is a channel response for a path from a speaker to the alternative sensor signal, G is a channel response for a path from ambient noise to the alternative sensor signal and where f is the set of frequencies in the speech spectral value.

10. The method of claim 9 further comprising iterating between estimating an energy-normalized noise-reduced speech spectral value for frame t and estimating the gain value for frame t multiple times.

11. The method of claim 9 wherein estimating the gain value comprises estimating a separate gain value for each frame of the air conduction microphone signal.

12. The method of claim 9 wherein the model of energy-normalized clean speech spectral values comprises a mixture model.

* * * * *